United States Patent
Cheng et al.

(10) Patent No.: US 11,790,188 B2
(45) Date of Patent: Oct. 17, 2023

(54) POSITIONING METHOD, POSITIONING SYSTEM, AND TAG

(71) Applicant: BOE TECHNOLOGY GROUP CO., LTD., Beijing (CN)

(72) Inventors: Jiuyang Cheng, Beijing (CN); Hao Tang, Beijing (CN); Quanguo Zhou, Beijing (CN); Qin Liu, Beijing (CN); Lirong Xu, Beijing (CN); Lijia Zhou, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 220 days.

(21) Appl. No.: 17/106,683

(22) Filed: Nov. 30, 2020

(65) Prior Publication Data
US 2021/0165977 A1 Jun. 3, 2021

(30) Foreign Application Priority Data
Nov. 29, 2019 (CN) .......................... 201911205924.4

(51) Int. Cl.
*G06K 7/10* (2006.01)
*G06Q 10/08* (2023.01)

(52) U.S. Cl.
CPC ..... *G06K 7/10099* (2013.01); *G06K 7/10366* (2013.01); *G06Q 10/08* (2013.01)

(58) Field of Classification Search
CPC ................................................ G06K 7/10099
See application file for complete search history.

(56) References Cited

U.S. PATENT DOCUMENTS

2007/0222674 A1\* 9/2007 Tan .......................... G01S 19/49
342/357.32

FOREIGN PATENT DOCUMENTS

| CN | 107300385 A | 10/2017 |
|---|---|---|
| CN | 109541529 A | 3/2019 |
| CN | 110049439 A | 7/2019 |
| CN | 110426040 A | 11/2019 |

OTHER PUBLICATIONS

Chinese Fist Office Action (w/ English translation) for corresponding Chinese Application No. 201911205924.4, dated Oct. 18, 2022, 16 pages.

\* cited by examiner

*Primary Examiner* — Rafferty D Kelly
(74) *Attorney, Agent, or Firm* — Dority & Manning, P.A.

(57) ABSTRACT

A positioning method performed at a server includes: receiving, at a frequency, arrival time information from a plurality of readers; determining, according to the arrival time information, that the tag is in a sensing auxiliary region of a positioning region; sending a first control command to one of the readers, so that the tag activates an inertial sensor thereof according to the first control command; receiving, from the reader, position information of the tag in the sensing auxiliary region obtained by the inertial sensor; determining, according to the position information of the tag in the sensing auxiliary region, a first motion trajectory of the tag in the sensing auxiliary region; and determining, according to the first motion trajectory, whether the tag enters one of the first regions.

12 Claims, 12 Drawing Sheets

POSITIONING METHOD, POSITIONING SYSTEM, AND TAG

CROSS-REFERENCE TO RELATED APPLICATION

This application claims priority to Chinese Patent Application No. 201911205924.4, filed on Nov. 29, 2019, which is incorporated herein by reference in its entirety.

TECHNICAL FIELD

The present disclosure relates to the field of positioning technologies, and in particular, to a positioning method, a positioning system, and a tag.

BACKGROUND

An ultra-wideband (UWB) indoor positioning technology has broad application prospects in industrial manufacturing; personnel management, vehicle management, warehouse management and other fields.

SUMMARY

In an aspect, a positioning method is provided. The method is performed at a server, and the method includes: receiving, at a frequency, arrival time information from a plurality of readers; determining, according to the arrival time information, that the tag is in a sensing auxiliary region of a positioning region; sending a first control command to one of the readers, so that the tag activates an inertial sensor thereof according to the first control command; receiving, from the reader, position information of the tag in the sensing auxiliary region obtained by the inertial sensor; determining, according to the position information of the tag in the sensing auxiliary region, a first motion trajectory of the tag in the sensing auxiliary region; and determining, according to the first motion trajectory, whether the tag enters one of the first regions. The arrival time information includes information indicating time at which the readers receive a same ultra-wideband signal transmitted by a tag. The positioning region includes a second region extending along a first direction and a plurality of first regions that are arranged on at least one side of the second region, at least some of the first regions located on each side of the second region are arranged along the first direction, the second region includes a plurality of sensing auxiliary regions, and each sensing auxiliary region is connected to at least one of the first regions.

In some embodiments, determining, according to the arrival time information, that the tag is in a sensing auxiliary region, includes: determining, according to the arrival time information, a coordinate of the tag in the first direction; and in response to determining that the coordinate of the tag in the first direction is within a coordinate range of the sensing auxiliary region in the first direction, determining that the tag is in the sensing auxiliary region.

In some embodiments, the second region further includes a plurality of non-sensing auxiliary regions. If it is determined that the tag does not enter any one of the first regions, the method further includes: determining, according to the first motion trajectory, whether the tag is in one of the non-sensing auxiliary regions; and sending a second control command to the reader in response to determining that the tag is in one of the non-sensing auxiliary regions, so that the tag controls the inertial sensor to be in a sleeping state according to the second control command.

In some embodiments, sending the second control command to the reader in response to determining that the tag is in one of the non-sensing auxiliary regions, so that the tag controls the inertial sensor to be in a sleeping state according to the second control command, includes: sending the second control command to the reader in response to determining that the tag is in one of the non-sensing auxiliary regions, so that according to the second control command, the tag controls the inertial sensor to be in the sleeping state and clears position information cached in the inertial sensor.

In some embodiments, determining, according to the first motion trajectory, whether the tag enters one of the first regions, includes: determining, according to the first motion trajectory, whether the tag gradually approaches one of the first regions; determining whether the server does not receive arrival time information from the readers within a preset period of time; in response to determining that the tag gradually approaches one of the first regions and that the server does not receive arrival time information from the readers within the preset period of time, determining that the tag enters one of the first regions; and if else, determining that the tag does not enter the first regions.

In some embodiments, after the tag enters one of the first regions, the method further includes: sending a third control command to the reader, so that according to the third control command, the tag reduces a frequency at which the tag transmits ultra-wideband signals.

In some embodiments, after the tag enters one of the first regions, the method further includes; determining, according to position information of the tag in the first region, a second motion trajectory of the tag in the first region.

In some embodiments, after the tag enters the first region, the method further includes: determining, whether the server receives arrival time information from the readers again; and in response to determining that the server receives arrival time information from the readers again, sending a fourth control command to the reader, so that according to the fourth control command, the tag increases a frequency at which the tag transmits ultra-wideband signals.

In some embodiments, in response to determining that the server receives arrival time information from the readers again, sending a fourth control command to the reader, so that according to the fourth control command, the tag increases a frequency at which the tag transmits ultra-wideband signals, includes: in response to determining that the server receives arrival time information from the readers again, sending a fourth control command to the reader, so that according to the fourth control command, the tag increases a frequency at which the tag transmits ultra-wideband signals, and clears position information cached in the inertial sensor.

In another aspect, a positioning method is provided. The positioning method is performed at a tag. The positioning method includes: transmitting, at a first frequency, ultra-wideband signals; receiving a first control command from a reader; in response to the first control command, activating an inertial sensor of the tag to obtain position information of the tag in real time; and sending the position information of the tag to the reader.

In some embodiments, the positioning method further includes: receiving a second control command from the reader; and in response to the second control command, controlling the inertial sensor to be in a sleeping state.

In some embodiments, the positioning method further includes: receiving a second control command from the reader; and in response to the second control command, controlling the inertial sensor to be in a sleeping state, and clearing position information cached in the inertial sensor.

In some embodiments, the positioning method further includes: receiving a third control command from the reader; in response to the third control command, transmitting the ultra-wideband signals at a second frequency, wherein the second frequency is less than the first frequency.

In some embodiments; after transmitting the ultra-wideband signals at the second frequency, the positioning method further includes: receiving a fourth control command from the reader; and in response to the fourth control command, transmitting the ultra-wideband signals at the first frequency.

In some embodiments, after transmitting the ultra-wideband signals at the second frequency, the positioning method further includes: receiving a fourth control command from the reader; and in response to the fourth control command, transmitting the ultra-wideband signals at the first frequency and clearing position information cached in the inertial sensor.

In yet another aspect, a tag is provided. The tag includes a pulse signal transmitter, a transceiver, a controller, and an inertial sensor. The pulse signal transmitter is configured to transmit ultra-wideband signals. The transceiver is configured to receive a first control command from a reader, and to send position information of the tag to the reader. The controller is configured to activate the inertial sensor in response to the first control command. The inertial sensor is configured to obtain the position information of the tag in real time.

In some embodiments, the transceiver includes a Bluetooth module or a Wi-Fi module.

In yet another aspect, a positioning system is provided. The positioning system includes the tag provided in any of the above embodiments, a plurality of readers, and a server. The plurality of readers are arranged along a first direction in a second region of a positioning region, and the positioning region includes the second region extending along the first direction and a plurality of first regions that are located on at least one side of the second region. At least some of the first regions located on each side of the second region are arranged along the first direction, the second region includes a plurality of sensing auxiliary regions, and each sensing auxiliary region is connected to at least one of the first regions. The plurality of readers are configured to receive the ultra-wideband signals from the tag, and to send arrival time information to a server, the arrival time information includes information indicating time at which the readers receive a same ultra-wideband signal transmitted by the tag. The server is configured to: receive, at a frequency, the arrival time information from the readers; determine; according to the arrival time information, that the tag is in a sensing auxiliary region; send a first control command to one of the readers; receive the position information of the tag in the sensing auxiliary region obtained by the inertial sensor from the reader; determine, according to the position information of the tag in the sensing auxiliary region, a first motion trajectory of the tag in the sensing auxiliary region; and determine, according to the first motion trajectory, whether the tag enters one of the first regions. The reader is further configured to: receive the first control command from the server; send the first control command to the tag; receive the position information of the tag from the tag; and send the position information of the tag to the server.

In some embodiments, the positioning system further includes a synchronization controller. The synchronization controller is configured to synchronize clocks of the readers and to realize information exchange between the reads and the server.

In some embodiments, the positioning system further includes a terminal device. The server is further configured to send trajectory information of the tag to the terminal device, the trajectory information of the tag includes first motion trajectories of the tag in the sensing auxiliary regions and second motion trajectories of the tag in the first regions. The terminal device is configured to receive and display the trajectory information of the tag.

In yet another aspect, a non-transitory computer-readable storage medium is provided. The non-transitory computer-readable storage medium stores computer programs that, when executed by a processor, cause the processor to perform the positioning method provided in any one of the above embodiments.

BRIEF DESCRIPTION OF THE DRAWINGS

In order to explain technical solutions in the embodiments of the present disclosure more clearly, the accompanying drawings used in some embodiments of the present disclosure will be introduced below briefly. However, the accompanying drawings to be described below show some illustrative embodiments of the present disclosure, and a person of ordinary skill in the art can obtain other drawings according to these drawings. In addition, the accompanying drawings to be described below may be regarded as schematic diagrams, and are not limitations on actual sizes of products, an actual process of a method and actual timings of signals that the embodiments of the present disclosure relate to.

DETAILED DESCRIPTION

Figure 1:
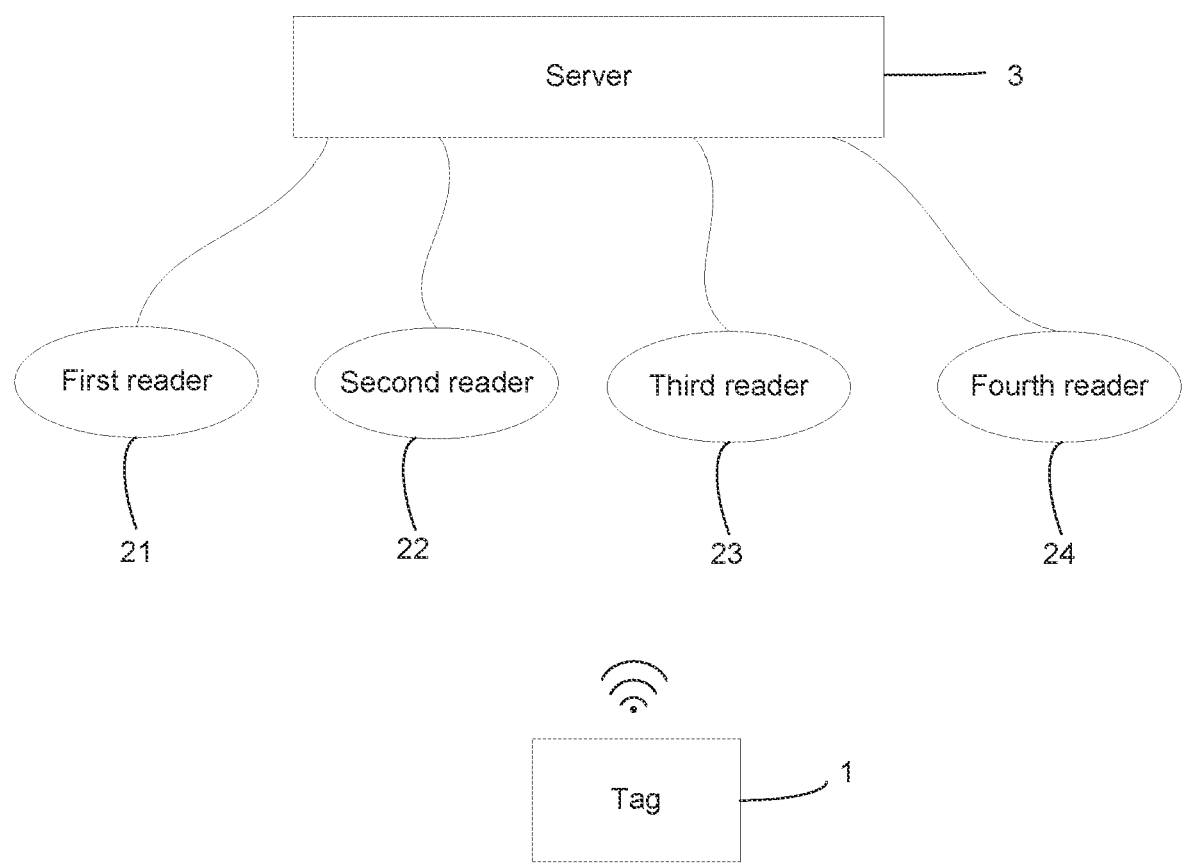
FIG. 1 is a schematic diagram of a positioning system, in accordance with some embodiments.

Technical solutions in some embodiments of the present disclosure will be described below clearly and completely with reference to the accompanying drawings. However, the described embodiments are merely some but not all embodiments of the present disclosure. All other embodiments obtained based on the embodiments of the present disclosure by a person of ordinary skill in the art shall be included in the protection scope of the present disclosure.

Unless the context requires otherwise, the term "comprise" and other forms thereof such as the third-person singular form "comprises" and the present participle form "comprising" throughout the description and the claims are construed as open and inclusive, i.e., "inclusive, but not limited to". In the description, the terms such as "one embodiment", "some embodiments", "exemplary embodiments", "example", "specific example", or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

Hereinafter, the terms such as "first" and "second" are used for descriptive purposes only, and are not to be construed as indicating or implying the relative importance or implicitly indicating the number of indicated technical features. Thus, features defined as "first" and "second" may explicitly or implicitly include one or more of the features. In the description of the embodiments of the present disclosure, the term "a plurality of" means two or more unless otherwise specified.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

"Approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "approximately" can mean within one or more standard deviations, or within ±30%, 20%, 10% or 5% of the stated value.

Due to restrictions of the Federal Communications Commission (FCC) on a power spectral density of civil ultra-wideband (UWB) signals, an arrangement density of UWB readers may be high, which may result in high costs.

In order to reduce the arrangement density of the readers, in the related art, different positioning methods may be used according to different regions and needs. For example, a two-dimensional positioning method or a three-dimensional positioning method is used in an open region, a one-dimensional positioning method is used in a long narrow corridor, and a zero-dimensional positioning method is used in the room. The zero-dimensional positioning method is also called an existence positioning method, through which whether an object to be positioned is located in the room can be determined, but a specific position of the object to be positioned in this room cannot be determined.

Generally, the higher the dimension of the positioning method is, the higher the density of the UWB readers is. But for the zero-dimensional positioning method, since the UWB signals may be blocked by obstacles such as walls, in order to determine whether the object to be positioned is in one of rooms, at least one UWB reader needs to be arranged in each room, which may cause high costs. Furthermore, in scenarios where there are a plurality of small rooms, such as a prison, a nursing home, an office building, and an apartment, the arrangement density of the UWB readers is even higher, and the costs may be higher.

Figure 2:
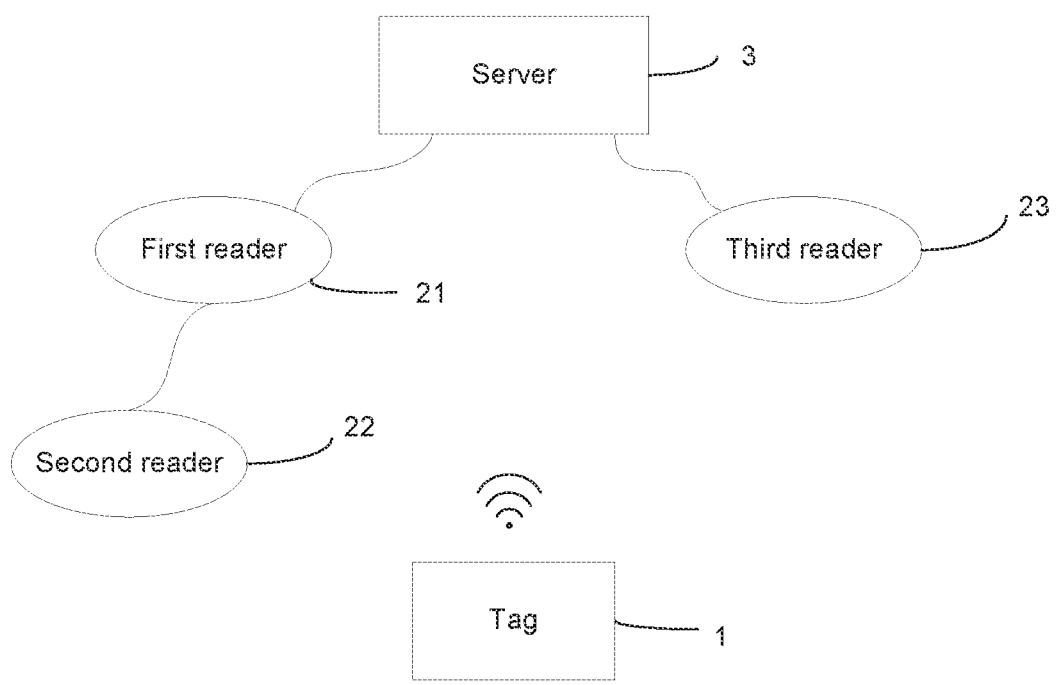
FIG. 2 is a schematic diagram of another positioning system, in accordance with some embodiments.

Some embodiments of the present disclosure provide a positioning system. As shown in FIGS. 1 and 2, the positioning system includes a tag 1, a plurality of readers 2 and a server 3.

The tag 1 may be carried or worn by a user who may enter a region (called a positioning region). In some examples, the tag 1 may be a UWB tag.

The readers 2 may be configured to transmit information between the server 3 and the tag 1. In some examples, the readers 2 may be UWB readers, and the plurality of readers 2 may include three or more readers 2.

The server 3 may be configured to determine the position of the tag 1 in the positioning region. In some examples, the server 3 may be a standalone server, or a distributed server that needs to cooperate with other servers. In a case where the server is the distributed server, data and a software system of the server may be distributed among the readers 2.

For the process of the positioning system locating the position of the tag 1 in the positioning region, reference may be made to the description of the positioning method provided by some embodiments of the present disclosure below, which will not be described herein.

Figure 3:
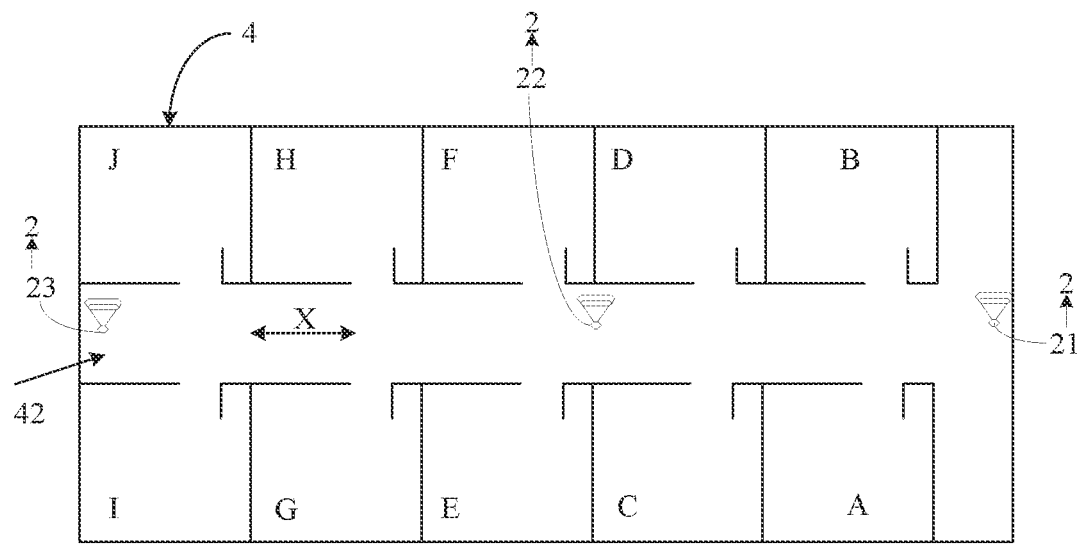
FIG. 3 is a plan view of a positioning region, in accordance with some embodiments.
Figure 5:
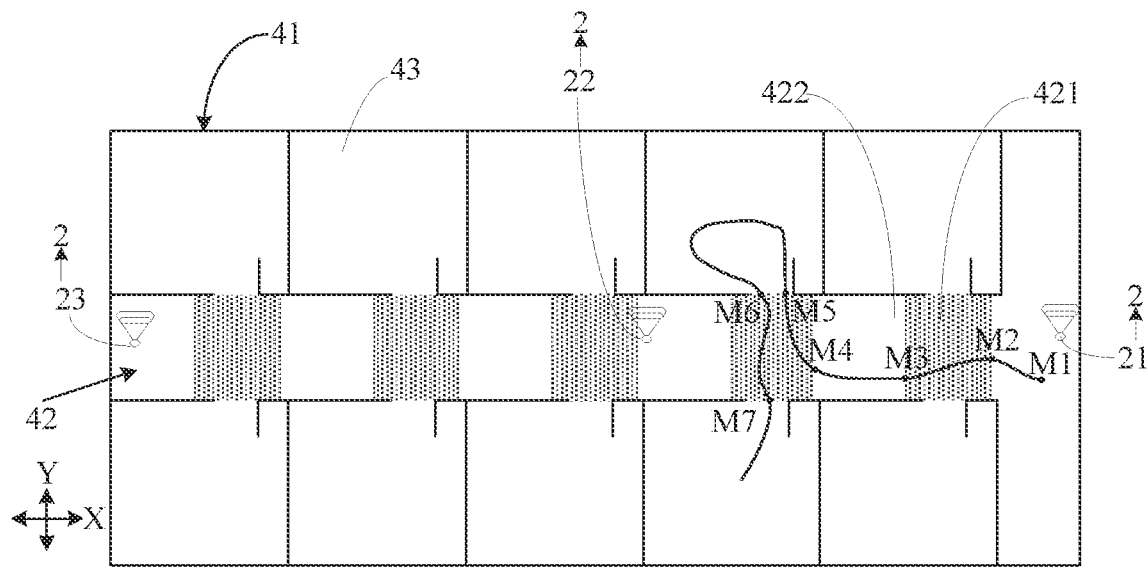
FIG. 5 is a schematic diagram of the positioning region in FIG. 3.

As shown in FIGS. 3 and 5, the positioning region 4 may include a second region 42 which extends along a first direction X, and a plurality of first regions 43 located on at least one side of the second region 42. The first regions 3 disposed on each side of the second region 2 are arranged along the first direction X, and two adjacent first regions 43 are separated.

As shown in FIG. 5, the second region 42 includes a plurality of sensing auxiliary regions 421, and each sensing auxiliary region 421 connects one first region 43 or two opposite first regions 43. In addition, the second region 42 further includes a plurality of non-sensing auxiliary regions 422. The non-sensing auxiliary regions 422 and the sensing auxiliary regions 421 are arranged alternately. The readers 2 are arranged along the first direction X in the second region 42.

In some embodiments, the positioning system may be used in a building. For example, the building is a hotel building, a dormitory building, a prison building, a nursing home building, or an office building.

In some examples, the positioning region 4 may be a region where any floor of the building is located, and the floor has a long narrow passage and a plurality of rooms located on two opposite sides of the long narrow passage. In this case, as shown in FIGS. 3 and 5, a region where the long narrow passage is located is the second region 42, and regions where the rooms A to J are located are the first regions 43, Portions of the second region 2, each of which is located between entrances of corresponding two opposite first regions 43, are the sensing auxiliary regions 421, and remaining portions of the second region 2 are the non-sensing auxiliary regions 422.

In some other examples, the positioning region 4 may be a region where a stairway of the building and a plurality of entrances to floors of the building are located. In this case, a region where the stairway is located is the second region 42, and regions where the entrances are located are the first regions 43. Portions of the second region 42 near the entrances are the sensing auxiliary regions 421, and remaining portions of the second region 42 are the non-sensing auxiliary regions 422.

The method of defining the sensing auxiliary region 421 in the second region 42 of the positioning region 4 will be described below by examples. It will be noted that, since FIG. 5 is a schematic diagram of the positioning region 4 in FIG. 3, ten first regions 43 in FIG. 5 each correspond to a respective one of the rooms A to J in FIG. 3.

With reference to FIGS. 3 and 5, after the plurality of readers 2 (e.g., the first reader 21, the second reader 22 and the third reader 23) are installed at designed positions, a preset position is taken as a reference point, and a distance from each of the plurality of readers 2 to the reference point in the first direction X is measured.

It will be noted that, positions of the first reader 21, the second reader 22, and the third reader 23 in FIGS. 3 and 5 are merely examples.

In some embodiments, the readers 2 are arranged in the second region 42. In some examples, the readers 2 are arranged in a straight line, and the readers 2 are spaced apart from each other. For example, as shown in FIGS. 3 and 5, the first reader 21 and the third reader 23 are arranged at two ends of the second region 42, and the second reader 22 is arranged in the middle area of the second region 42. The distance between two adjacent reads 2 may be selected according to actual needs. For example, a distance between two adjacent readers 2 ranges from 15 m to 20 m, such as 15 m, 16 m, 17 m, 18 m, 19 m, or 20 m.

Figure 6:
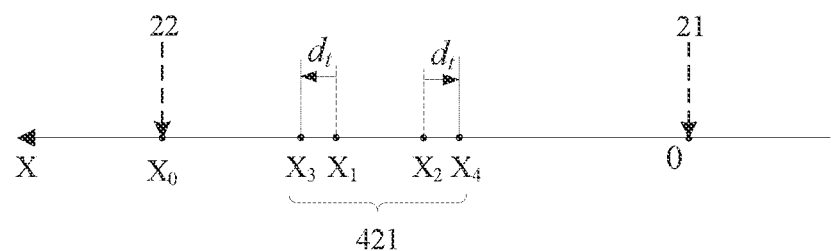
FIG. 6 is a schematic diagram showing how to obtain a sensing auxiliary region in the positioning region of FIG. 5, in accordance with some embodiments.

On this basis, if the connecting line between the first reader 21 and the second reader 22 extends in the first direction X, with reference to FIGS. 5 and 6, a one-dimensional coordinate system is created by using the connecting line between the first reader 21 and the second reader 22. A position of the first reader 21 is a zero point of the coordinate system, and a distance from the second reader 22 to the first reader 21 is $X_0$, that is, a coordinate of the second reader 22 is $X_0$.

With reference to FIGS. 3 and 5, there are two opposite first regions corresponding to room A and room B on both sides of the second region 42. As shown in FIG. 6, point $X_1$ and point $X_2$ are set between the zero point and the point $X_0$, and a distance between the point $X_1$ and the point X represents a position of an entrance of each of the room A and the room B in the one-dimensional coordinate system, Point $X_3$ is set between the point $X_1$ and the point $X_0$, and a distance between the point $X_3$ and the point $X_1$ is $d_r$. In addition, point $X_4$ is set between the point $X_2$ and the zero point, and a distance between the point $X_4$ and the point $X_2$ is $d_r$. With reference to FIG. 5, a region between entrances of the two opposite first regions corresponding to the room A and the room B in the second region 42 is an entrance region, and there are two regions disposed on both sides of the entrance region in the first direction X and widths of the two regions in the first direction X are $d_r$. The entrance region and the two regions are taken as the sensing auxiliary region 421 as a whole. Similarly, sensing auxiliary regions 421 corresponding to entrances of remaining rooms are arranged in the second region 42 in a similar manner.

It will be noted that, the distance $d_r$ is greater than a product of a positioning information feedback delay t and a movement speed of the tag 1. The positioning information feedback delay t is a duration from a time when the tag 1 transmits the ultra-wideband signal to a time when the tag 1 receives feedback information from the server 3, and the feedback information indicates that the server 3 received the ultra-wideband signal. The movement speed of the tag 1 takes an empirical value. For example, the movement speed of the tag 1 takes a maximum value in a range of speed of the tag 1, For example, if a person carries the tag 1, the movement speed of the tag 1 takes a maximum value (e.g., 5 m/s) in a range of movement speed of the person.

In addition, if the first reader 21 and the second reader 22 are not arranged in a straight line extending in the first direction X, the one-dimensional coordinate system may be created by using the line extending in the first direction X and passing through the first reader 21. Of course, other methods may be selected to create the one-dimensional coordinate system.

It will be noted that, a manner in which the server 3 is communicatively connected to the readers 2 is not limited in the embodiments of the present disclosure, as long as the communication between the server 3 and the readers 2 can be achieved.

In some examples, each reader 2 is connected to the server 3 in a wired manner. For example, each reader 2 is connected to the server 3 through one or more cables (such as one or more fiber optic cables). For example, as shown in FIG. 1, the plurality of readers 2 include four readers 2, i.e., the first reader 21, the second reader 22, the third reader 23 and the fourth reader 24, and the four readers 2 are each connected to the server 3 through an fiber optic cable. Of course, the reader 2 may also be communicatively connected to the server 3 in other wired manners, or the reader 2 may also be communicatively connected to the server 3 in a wireless manner, such as Bluetooth, or Wi-Fi.

In some other examples, at least one of the plurality of readers 2 is connected to the server 3 in the wired manner, and remaining readers 2 are connected to the server 3 through the at least one reader 2. For example, as shown in FIG. 2, the plurality of readers 2 include three readers 2, i.e., the first reader 21, the second reader 22, and the third reader 23. The first reader 21 and the third reader 23 are connected to the server 3 in the wired manner. The second reader 22 is connected to the first reader 21 in the wired manner, so as to communicate with the server 3 through the first reader 21. Herein, the data transmission between the server 3 and the second reader 22 through the first reader 21 is a transparent transmission. The transparent transmission refers to that the first reader 21 does not change the data in the process of data transmission.

Figure 7:
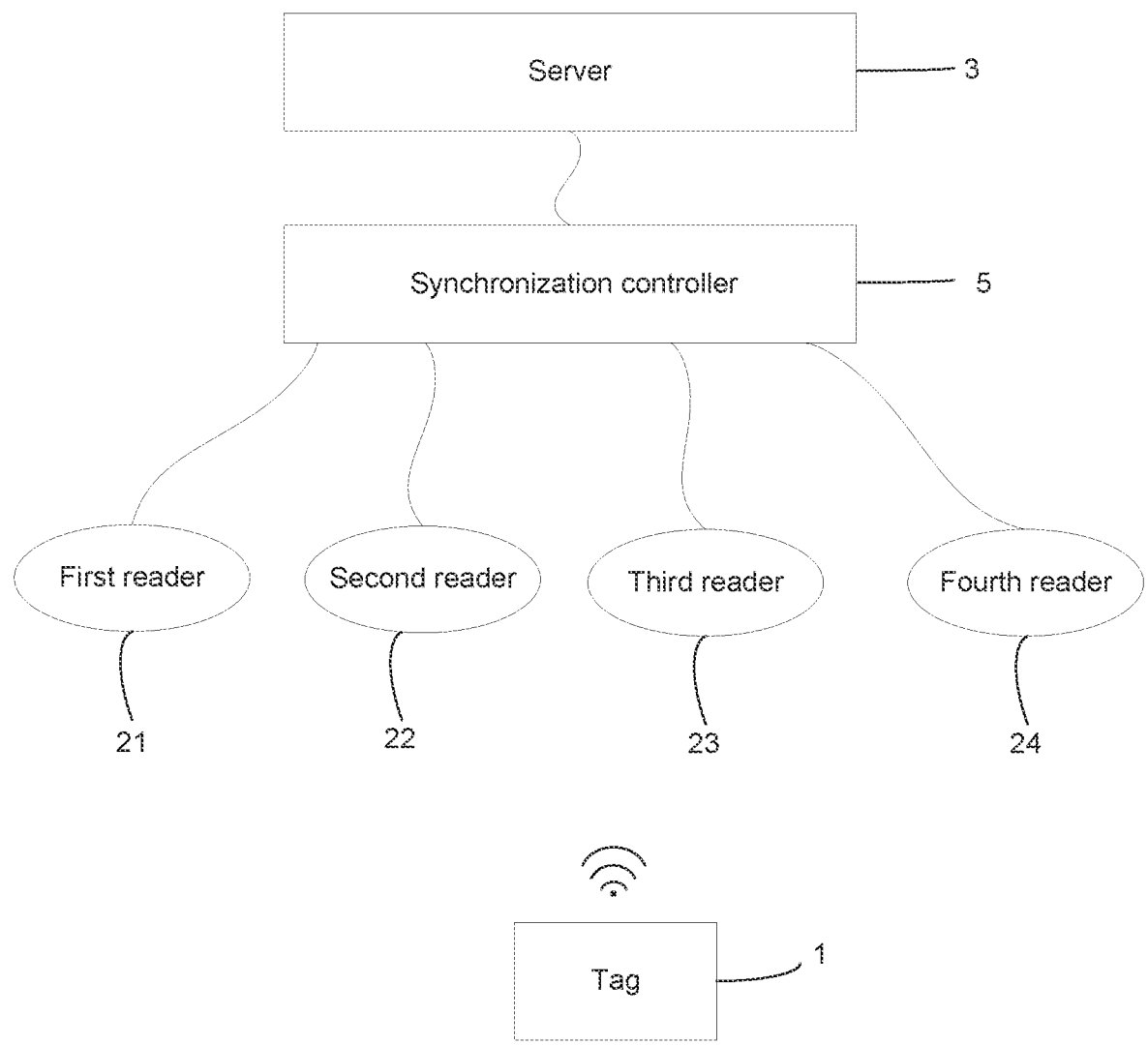
FIG. 7 is a schematic diagram of yet another positioning system, in accordance with some embodiments.
Figure 8:
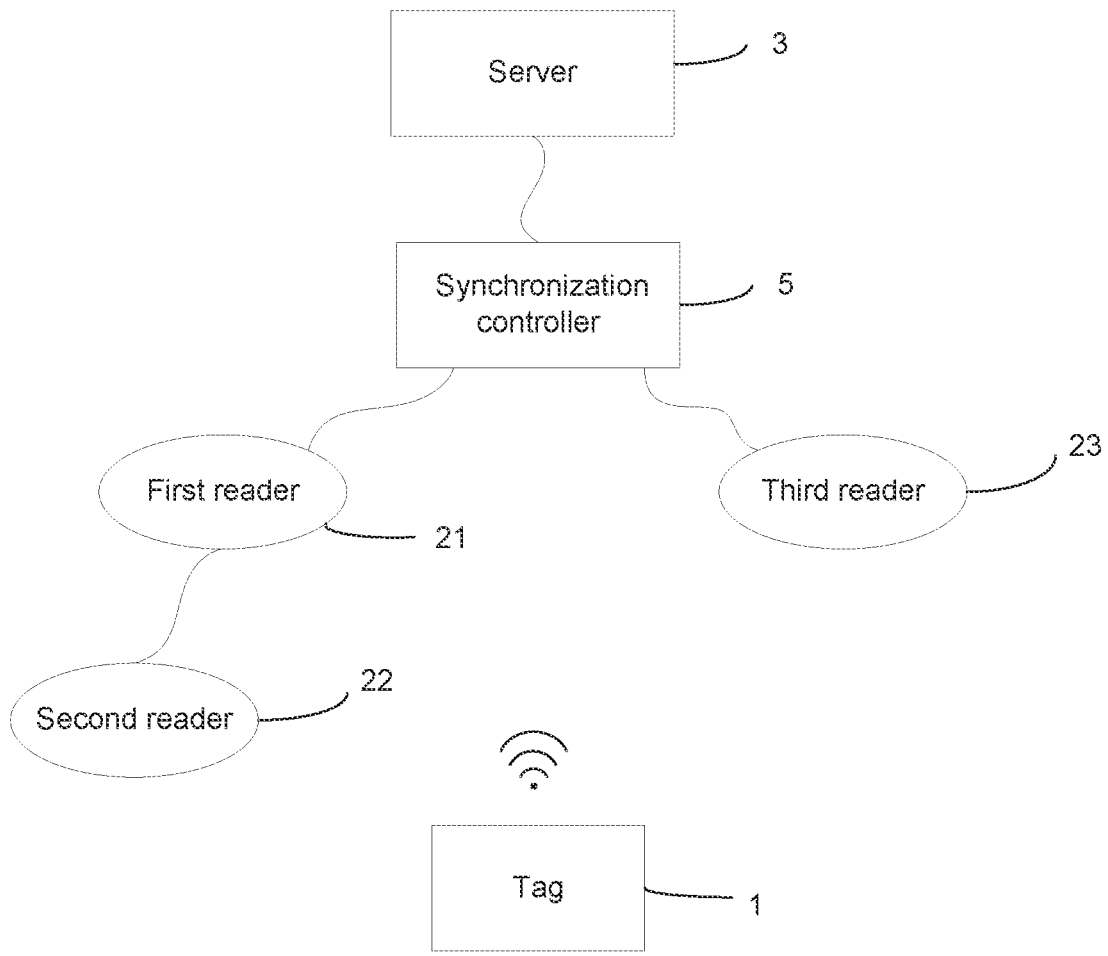
FIG. 8 is a schematic diagram of yet another positioning system, in accordance with some embodiments.

In some embodiments, as shown in FIGS. 7 and 8, the positioning system further includes a synchronization controller 5. The synchronization controller 5 may be configured to synchronize clocks of the readers 2 and to realize information exchange between the reads 2 and the server 3.

In some examples, the synchronization controller 5 is a network switch supporting a clock synchronization function. The network switch is a device in a computer network that connects many network devices together. The network switch manages the flow of data across the computer network by transmitting a received network packet only to the one or more network devices.

The synchronization controller 5 is communicatively connected to the plurality of readers 2 and the server 3. The synchronization controller 5 is configured to exchange information between the plurality of readers 2 and the server 3, and to synchronize clocks of the plurality of readers 2. In some examples, the synchronization controller 5 may transmit a clock synchronization signal to each reader 2, so that a clock synchronization among the plurality of readers 2 may be achieved.

In some examples, each reader 2 is connected to the synchronization controller 5 in the wired manner. For example, each reader 2 is connected to the synchronization controller 5 through a cable. For example, as shown in FIG. 7, the plurality of readers 2 include four readers 2, which are the first reader 21, the second reader 22, the third reader 23, and the fourth reader 24. The first reader 21, the second reader 22, the third reader 23, and the fourth reader 24 are all connected to the synchronization controller 5 through the fiber optic cables. Of course, the first reader 21, the second reader 22, the third reader 23, and the fourth reader 24 may also be communicatively connected to the synchronization controller 5 in other wired or wireless manners.

In some other examples, at least one of the plurality of readers 2 is connected to the synchronization controller 5 in the wired manner, and the remaining readers 2 are connected to the synchronization controller 5 through the at least one reader 2. For example, as shown in FIG. 8, the plurality of readers 2 include three readers 2, which are the first reader 21, the second reader 22, and the third reader 23. The first reader 21 and the third reader 23 are connected to the synchronization controller 5 in the wired manner. The second reader 22 is connected to the first reader 21 in the wired manner to be connected to the synchronization controller 5 through a connection established between the first reader 21 and the synchronization controller 5. Herein, during a communication between the second reader 21 and the synchronization controller 5, the first reader 21 does not change the information transmitted between the second reader 21 and the synchronization controller 5.

In some examples, the synchronization controller 5 and the server 3 may be connected through a fiber optical cable, or may be connected in a wireless manner. Of course, the synchronization controller 5 may also be integrated in the server 3.

Figure 9:
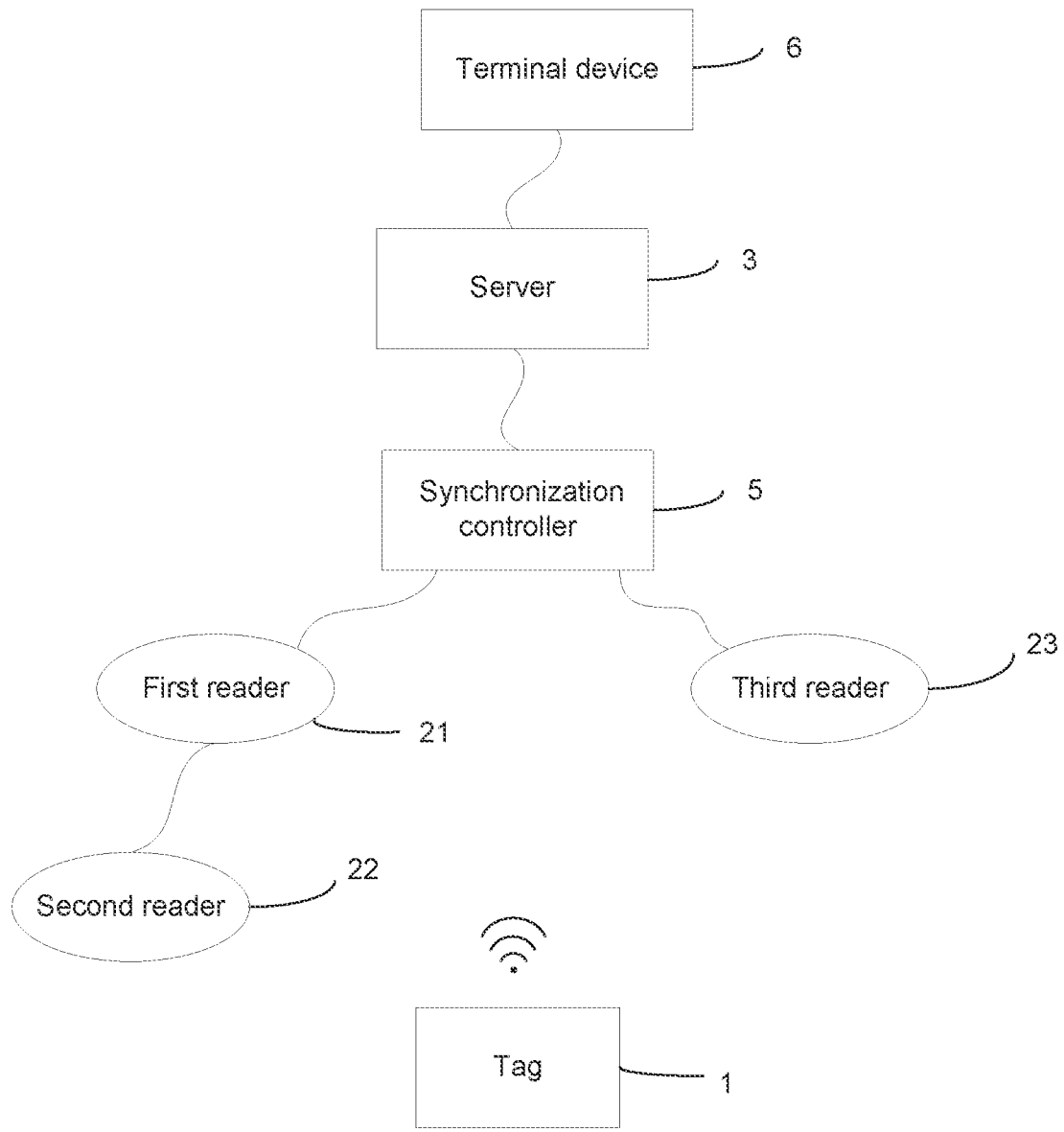
FIG. 9 is a schematic diagram of yet another positioning system, in accordance with some embodiments.

In some embodiments, as shown in FIG. 9, the positioning system further includes a terminal device 6 connected to the server 3.

The server 3 is further configured to send trajectory information of the tag 1 to the terminal device 6. The trajectory information of the tag 1 includes first motion trajectories of the tag 1 in the sensing auxiliary regions 421 and second motion trajectories of the tag 1 in the first regions 43, The terminal device 6 is configured to receive and display the trajectory information of the tag 1.

In some examples, the server 3 may also send weather information or prompt information to the terminal device 6. The terminal device 6 is further configured to receive and display the weather information or the prompt information.

In some examples, the terminal device 6 may be any product or part having a display function, such as a mobile phone, a tablet personal computer, a television, a display, a notebook computer, or a digital photo frame. The terminal device 6 may be also a wearable electronic device such as a smart watch, or a smart bracelet.

Figure 12A:
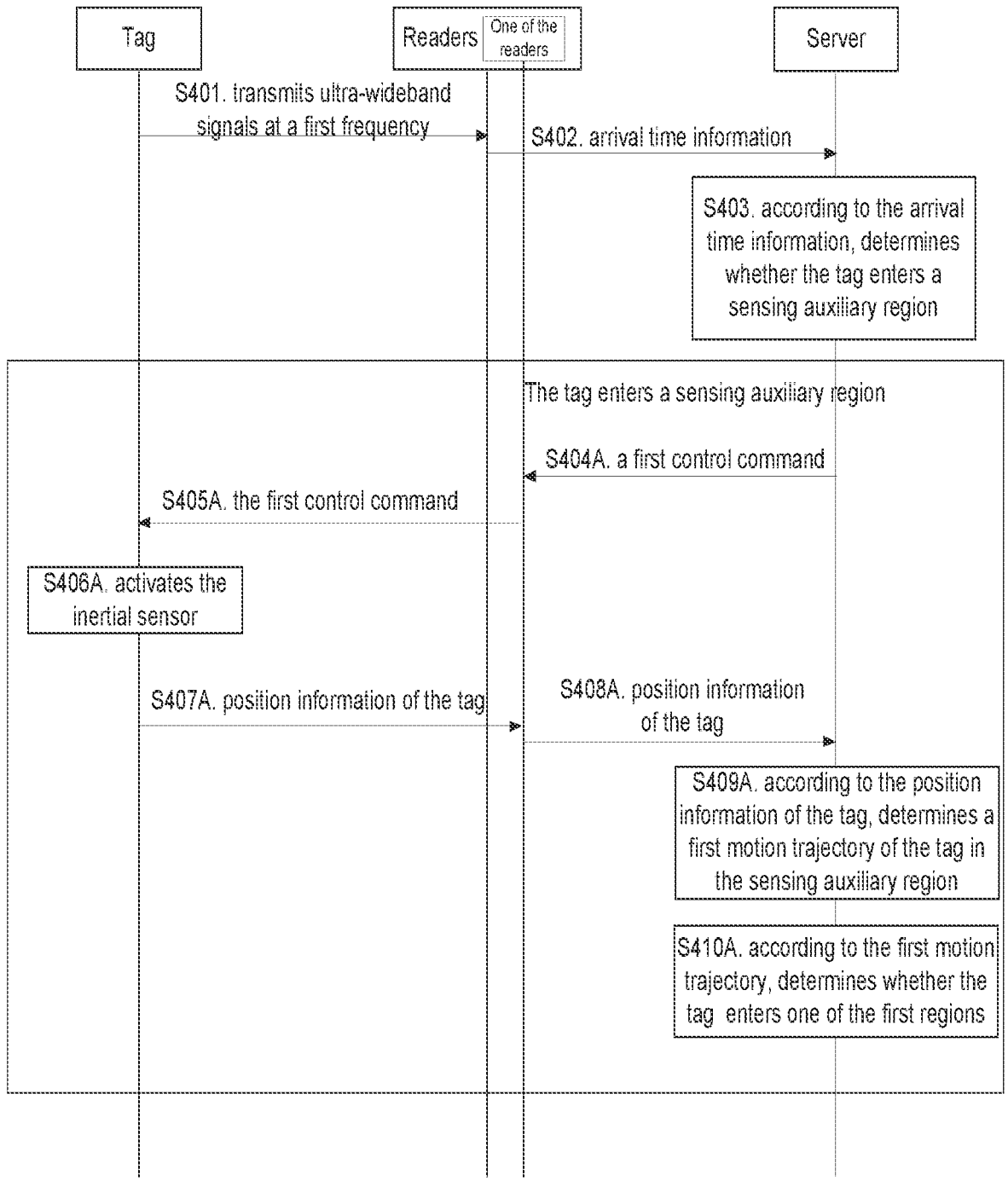
FIG. 12A is a flow diagram of a positioning method, in accordance with some embodiments.

Some embodiments of the present disclosure provide a positioning method, which may be performed at the positioning system provided in any of the above embodiments. Referring to FIGS. 12A and 12D, the positioning method includes step 401 (S401) to step 403 (S403).

In S401, the tag 1 transmits ultra-wideband signals at a first frequency. The readers 2 receive the ultra-wideband signals from the tag 1.

The first frequency may be reasonably set according to actual needs. In an example where the user carries the tag 1, the first frequency may range from approximately 20 Hz to approximately 15 Hz.

In some examples, the frequency at which the readers 2 receive the ultra-wideband signals transmitted by the tag 1 is equal to the first frequency.

In some examples, the tag 1 has a unique device identification. In order to enable the readers 2 receiving the ultra-wideband signals to identify which tag 1 sends the ultra-wideband signals, the device identification of the tag 1 may be carried in the ultra-wideband signals transmitted by the tag 1.

In S402, the readers 2 send arrival time information to the server 3. The server 3 receives the arrival time information from the readers 2 at a frequency.

The server 3 may obtain, according to the arrival time information, the arrival time of a same ultra-wideband signal transmitted by the tag 1, i.e., time at which the readers 2 receive the same ultra-wideband signal.

In some examples, once the readers 2 receive an ultra-wideband signal transmitted by the tag 1, the readers 2 send arrival time information corresponding to the received ultra-wideband signal to the server 3. It means that the readers 2 send the arrival time information in real time. In this case, the frequency at which the readers 2 send the arrival time information is equal to the first frequency.

In some examples, the frequency at which the server 3 receives the time information may be a preset frequency, and may be set according to actual needs. For example, the frequency may be the same as the frequency at which the readers 2 send the arrival time information, i.e., the first frequency.

In some examples, each reader 2 has a unique identification, and the arrival time information may include the identification of the reader 2.

It will be noted that, if the tag 1 is within the second region 42, the readers 2 may receive the ultra-wideband signal. And if the tag 1 is within one of the first regions 43, the readers 2 may not receive the ultra-wideband signal.

In S403, according to the arrival time information, the server 3 determines whether the tag 1 is in a sensing auxiliary region 421 of the positioning region 4.

In some embodiments, determining, according to the arrival time information, whether the tag 1 is in a sensing auxiliary region 421, includes: determining, according to the arrival time information, a coordinate of the tag in the first direction X; in response to determining that the coordinate of the tag 1 in the first direction X is within a coordinate range of the sensing auxiliary region 421 in the first direction X, determining that the tag 1 is in the sensing auxiliary region; and in response to determining that the coordinate of the tag 1 in the first direction X is not within the coordinate range of the sensing auxiliary region 421 in the first direction X, determining that the tag 1 is not in the sensing auxiliary region 421.

In some examples, the server 3 may use the time difference of arrival (TDOA) algorithm to calculate the coordinate of the tag 1 in the first direction X. TDOA is a method using the arrival time difference between three or more fixed stations to locate the position coordinates of a mobile target. Compared with a dimension of the second region 421 in the first direction X, a dimension of the second region 421 in the second direction Y is quite small. Therefore, the coordinate of the tag 1 in the second direction Y calculated using TDOA may be inaccurate, and thus the server 3 only uses the coordinate of the tag 1 in the first direction X to determine whether the tag 1 is in the sensing auxiliary region 421.

In some embodiments, as shown in FIGS. 12A to 12D, the positioning method further includes step 404A (S404A) to step 410A (S410A).

In S404A, if the sever 3 determines that the tag 1 is in a sensing auxiliary region 421 according to the arrival time information, the server 3 sends a first control command to one of the readers 2. The reader 2 receives the first control command from the server 3, so that the tag 1 activates an inertial sensor of the tag 1 according to the first control command.

In some examples, the reader 2 used for transmitting information between the server 3 and the tag 1 is a reader 2 closest to the server 3 in the plurality of readers 2. In some other examples, the reader 2 used for transmitting information between the server 3 and the tag 1 may also be any one of the plurality of readers 2. In either of the above cases, the reader 2 used for transmitting information between the server 3 and the tag 1 may be agreed in advance. In some examples, the identification of the agreed reader 2 may be pre-stored by the server 3.

In S405A, the reader 2 sends the first control command to the tag 1. The tag 1 receives the first control command from the reader 2.

In S406A, in response to the first control command, the tag 1 activates the inertial sensor thereof to collect position information of the tag 1.

It will be noted that, the inertial sensor transduces inertial force into measurable electrical signals to measure acceleration and angular velocities of an object, and then calculates the position information (e.g., the position coordinates in a coordinate system) of the object according to the measured information. In the embodiments, the position information of the tag 1 includes the coordinates of the tag 1 in the first direction X and the coordinates of the tag 1 in the second direction Y.

In S407A, the tag 1 sends the position information of the tag 1 to the reader 2. The reader 2 receives the position information of the tag 1.

In S408A, the reader 2 sends the position information of the tag 1 to the server 3. The server 3 receives the position information of the tag 1 from the reader 2.

In S409A, according to the position information of the tag 1 in the sensing auxiliary region, the server 3 determines a first motion trajectory of the tag 1 in the sensing auxiliary region.

Alternatively, since the coordinates of the tag 1 in the first direction X have been obtained in S403, the server 3 may determine the first motion trajectory according to the coordinates of the tag 1 in the first direction X calculated in S403 and the coordinates of the tag 1 in the second direction Y included in the position information.

In S410A, according to the first motion trajectory, the server 3 determines whether the tag 1 enters one of the first regions 43.

It will be noted that, the server 3 may receive the position information of the tag 1 from the readers 2 in real time, and then determine, according to the position information of the tag 1 in the sensing auxiliary region, the first motion trajectory of the tag 1 in the sensing auxiliary region in real time. In this way, the positions of the tag 1 showed by the motion trajectory obtained by the positioning method are real-time positions. Of course, if the user does not have a high requirement in real-time performance of the positioning method, the server 3 may also receive the position information of the tag 1 at a lower frequency than the frequency at which the reader 2 sends the position information of the tag 1, which may be determined according to actual scenarios.

In some embodiments, the S410A, in which the server 3 determines, according to the first motion trajectory, whether the tag 1 enters one of the first regions 43, includes the following steps.

The server 3 determines whether the tag 1 was gradually approaching a first region 43 according to the first motion trajectory, and determines whether the server 3 did not receive arrival time information from the readers 2 within a preset period of time.

In response to determining that the tag 1 was gradually approaching the first region 43 and that the server 3 did not receive arrival time information from the readers 2 within the preset period of time, the server 3 determines that the tag 1 has entered one of the first regions 1.

If else, the server 3 determines that the tag 1 did not enter the first regions 43.

The preset period of time may be set according to actual needs. For example, the preset period of time may be set as two transmitting period of the ultra-wideband signals.

It will be noted that, if the tag 1 is gradually approaching the first region 43, it indicates that the user tends to enter the first region 43. The plurality of readers 2 are all in the second region 42, and when the tag 1 enters a first region 43, the ultra-wideband signals transmitted by tag 1 are blocked by walls, which causes the plurality of readers 2 to fail to receive the ultra-wideband signals. Therefore, in the case where the server 3 does not receive the arrival time information sent by the readers 2 within a period of time, it indicates that the user has entered the first region 43, that is, the tag 1 has entered the first region 43.

In the positioning system provided by some embodiments of the present disclosure, if the server 3 determines that the tag 1 is in a sensing auxiliary region of the positioning region according to the received arrival time information, the server 3 then sends the first control command to one of the readers 2 to instruct the tag 1 to activate the inertial sensor, so as to obtain position information of the tag 1 in the sensing auxiliary region. According to the position information of the tag 1 in the sensing auxiliary region, the server 3 obtains the first motion trajectory of the tag 1 in the sensing auxiliary region. According to the first motion trajectory, the server 3 may determine whether the tag 1 has entered one of the first regions and which first region did the tag 1 enter. On this basis, in the positioning system, the ultra-wideband signals and the position information measured by the inertial sensor are used to locate the position of the tag 1. Since the readers 2 are only arranged in the second region 42, that is, since there are no readers 2 arranged in each first region 43, the number of the readers 2 may be reduced, and thus the costs may be reduced.

Figure 12B:
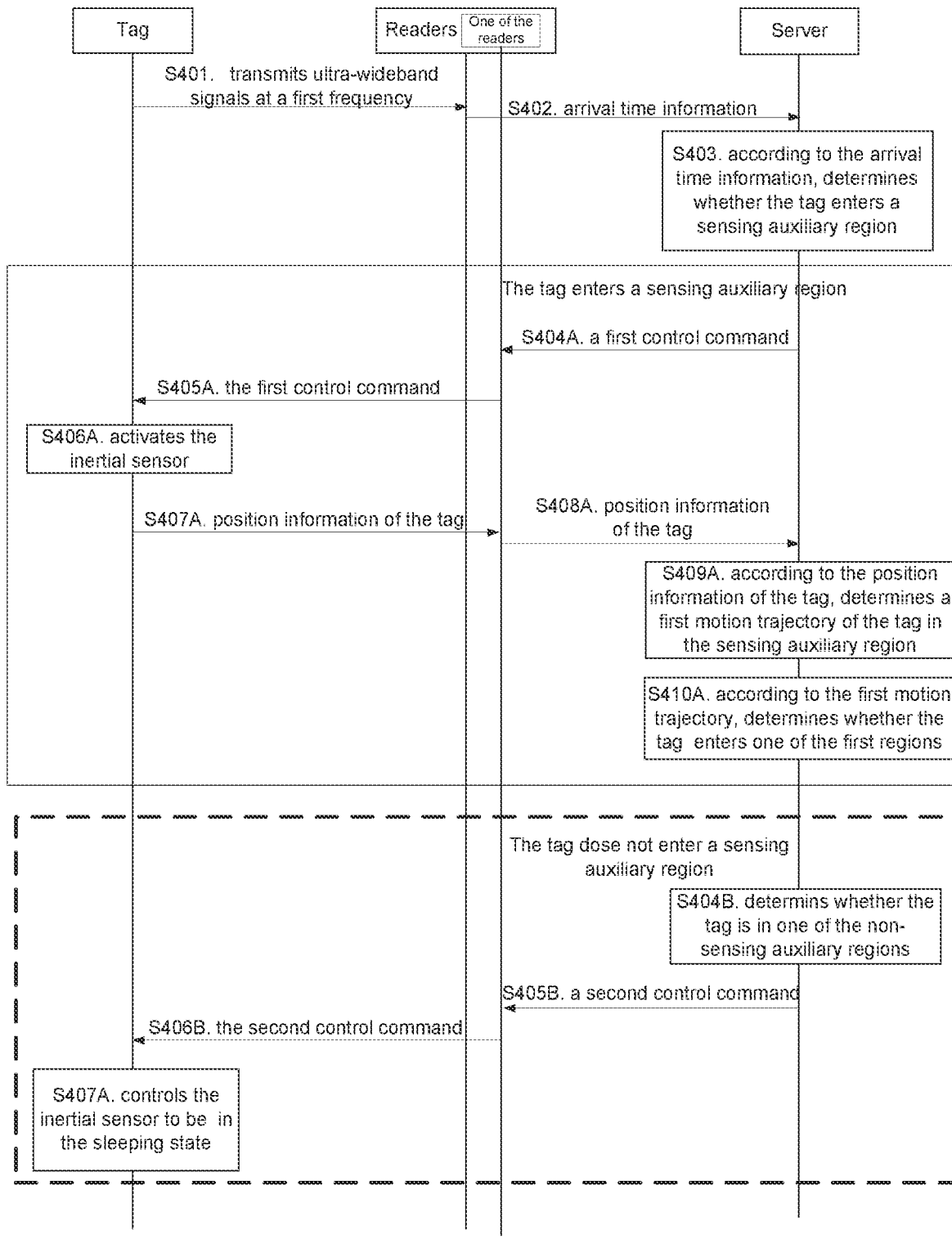
FIG. 12B is a flow diagram of another positioning method, in accordance with some embodiments.
Figure 12C:
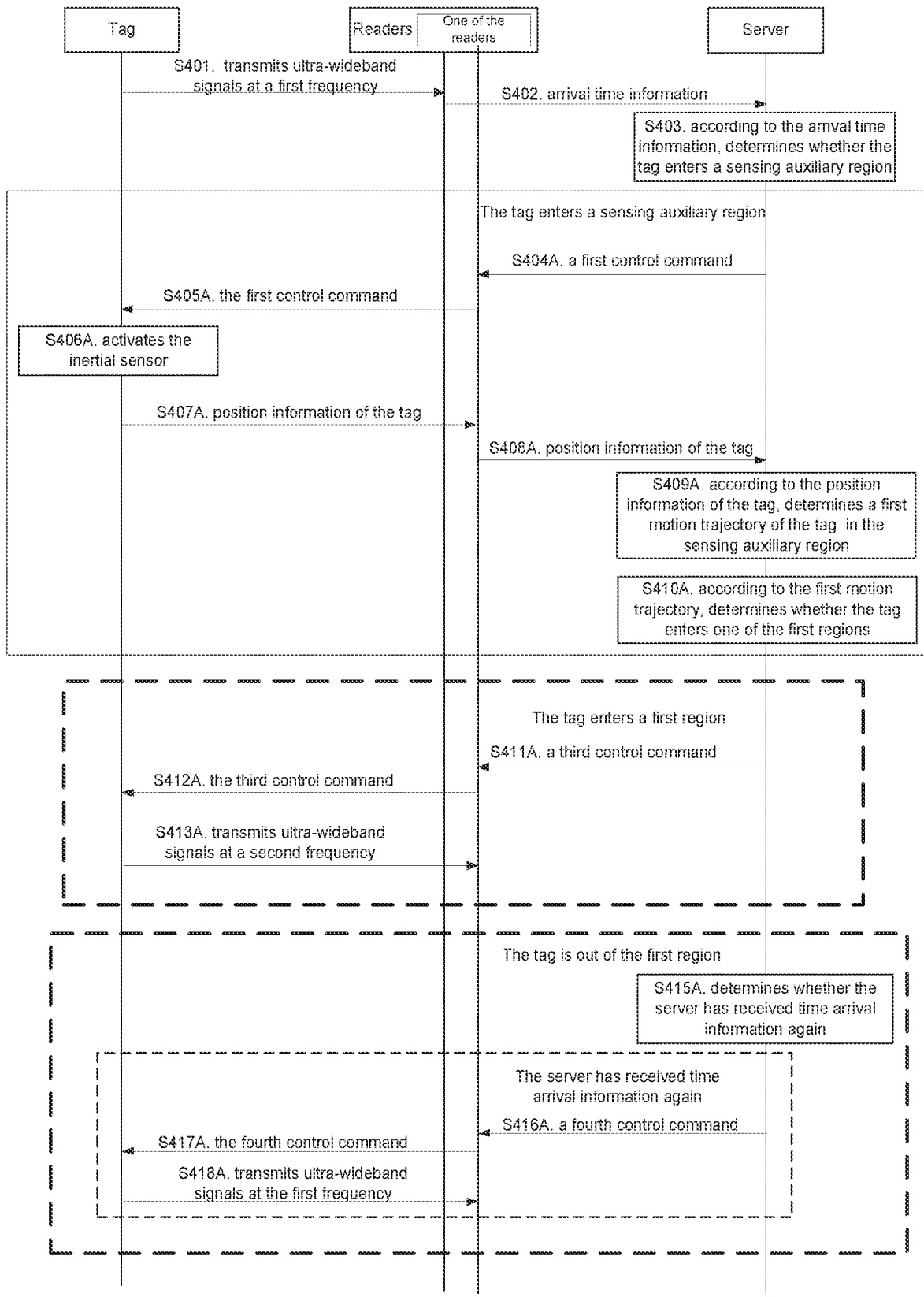
FIG. 12C is a flow diagram of yet another positioning method, in accordance with some embodiments.
Figure 12D:
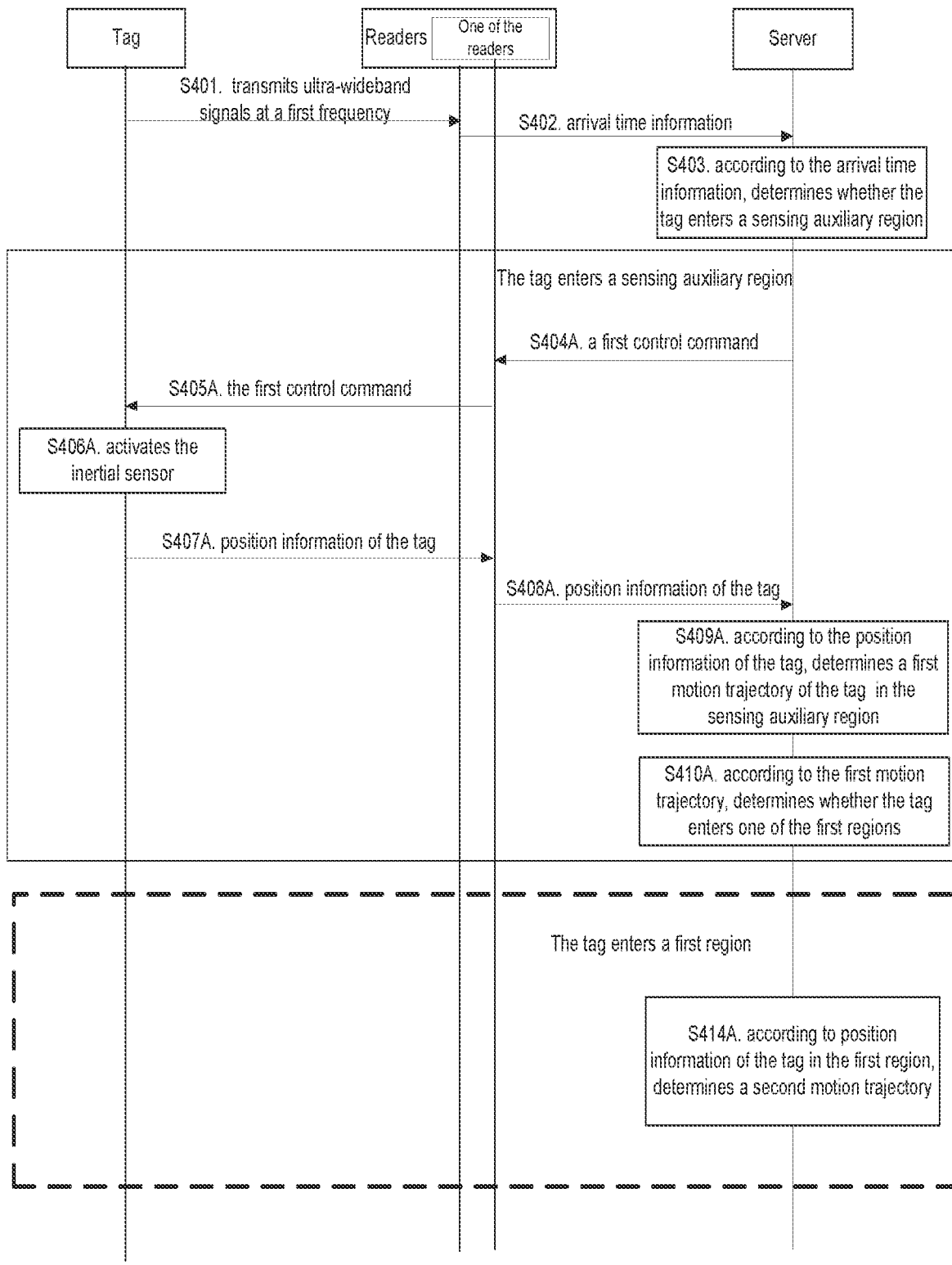
FIG. 12D is a flow diagram of yet another positioning method, in accordance with some embodiments.

In some other embodiments, as shown in FIG. 12B, in a case where the tag 1 does not enter any one of the first regions 43, the positioning method further includes step 404B (S404B) to step 406B (3406B).

In S404B, according to the first motion trajectory, the server 3 determines whether the tag 1 is in one of the non-sensing auxiliary regions 422.

In S405B, in response to determining that the tag 1 is in one of the non-sensing auxiliary regions 422, the server 3 sends a second control command to the reader 2. The reader 2 receives the second control command.

In some examples, the second control command is used to instruct the tag 1 to control the inertial sensor thereof to be in a sleeping state.

In S406B, the reader 2 sends the second control command to the tag 1. The tag 1 receives the second control command from the reader 2.

In S407B, in response to the second control command, the tag 1 controls the inertial sensor to be in the sleeping state.

In a case where the tag 1 is in the non-sensing auxiliary region 422, since the tag 1 cannot enter the first region 43 directly from the non-sensing auxiliary region 422, it is unnecessary to know the coordinates of the tag 1 in the second direction Y. In addition, the coordinates of the tag 1 in the first direction X are accurately positioned only through the ultra-wideband signals. Therefore, in the case where the tag 1 is in the non-sensing auxiliary region 422, the inertial sensor may be in the sleeping state, which may reduce an energy consumption of the tag 1.

In some other examples, the second control command is further used to instruct the tag 1 to clear position information cached in the inertial sensor. In this case, in response to the second control command, the tag 1 may further clear position information cached in the inertial sensor.

In the examples, when the inertial sensor is controlled to be in the sleeping state, the tag 1 clears the position information cached in the inertial sensor, which may improve an accuracy of the position information.

In some embodiments, as shown in FIG. 12O, in a case where the tag 1 entered the first region 43, after the tag 1 enters the first region 43, the method further includes the following steps.

In S411A, the server 3 sends a third control command to the reader 2. The reader 2 receives the third control command from the server 3.

In some examples, the third control command is used to instruct the tag 1 to reduce the frequency at which ultra-wideband signals are transmitted.

In S412A, the reader 2 sends the third control command to the tag 1. The tag 1 receives the third control command from the reader 2.

In S413A, in response to the third control command, the tag 1 transmits ultra-wideband signals at a second frequency which is less than the first frequency.

It will be noted that, the specific values of the first frequency and the second frequency are not limited in the embodiments of the present disclosure, as long as it is possible to ensure that the second frequency is less than the first frequency, and when the tag 1 transmits the ultra-wideband signals at the second frequency in the second region 42, the ultra-wideband signals may be received by the readers 2.

After the tag 1 enters the first region 43, due to obstructions (e.g., the room walls or stairs), the readers 2 located in the second region 42 cannot receive the ultra-wideband signals transmitted by the tag 1 in the first region 43. By sending the third control command to the tag 1, the frequency at which the tag 1 transmits the ultra-wideband signals is reduced from the first frequency to the second frequency, which may reduce a power consumption of the tag 1.

In some other examples, the third control command is further used to instruct the tag 1 to clear position information cached in the inertial sensor. In this case, in response to the third control command, the tag 1 may further clear position information cached in the inertial sensor.

In some embodiments, as shown in FIG. 12D, after the tag 1 enters the first region, the positioning method further includes step 414A (S414A).

In S414A, according to position information of the tag in the first region 43, the server 3 determines a second motion trajectory of the tag 1 in the first region 43.

In this way, motion information of the user may be known through the second motion trajectory of the tag 1.

In some embodiments, as shown in FIG. 12O, after the tag 1 enters the first region, the positioning method further includes step 415A (S415A) to step 418A (S418A).

In S415A, the server 3 determines whether the server 3 has received arrival time information from the readers 2 again.

In S416A, in response to determining that the server 3 has received arrival time information from the readers 2 again, the server 3 sends a fourth control command to the reader 2. The reader 2 receives the fourth control command from the server 3.

In some examples, the fourth control command is used to instruct the tag 1 to increase the frequency at which ultra-wideband signals are transmitted.

In S417A, the reader 2 sends the fourth control command to the tag 1. The tag 1 receives the fourth control command from the reader 2.

In S418A, in response to the fourth control command, the tag 1 transmits ultra-wideband signals at the first frequency.

In some other examples, the fourth control command is further used to instruct the tag 1 to clear position information cached in the inertial sensor. In this case, in response to the fourth control command, the tag 1 may further clear position information cached in the inertial sensor.

In the case where the server 3 receives arrival time information from the readers 2 again, it indicates that the tag 1 enters the second region 42 from the first region 43. Therefore, the transmitting frequency of the ultra-wideband signals needs to be increased, so that the ultra-wideband signals may be used again to locate the position of the tag 1 in the second region 42.

A process of positioning the tag 1 by the positioning system is described by taking an example in which the tag 1 moves along path M1-M2-M3-M4-M5 in FIG. 5.

The tag 1 starts to move from point M1, and in the moving process, the tag 1 transmits the ultra-wideband signals. At least three readers 2 in the plurality of readers 2 receive the ultra-wideband signals, and each reader 2 sends arrival time information to the server 3. The server 3 determines the coordinates of the tag 1 in the first direction X in the second region 42 according to the received arrival time information from the at least three readers 2.

When the tag 1 moves to the point M2 from the point M1, the server 3 determines that the tag 1 is in the sensing auxiliary region 421 according to the coordinate of the tag 1 in the first direction X, and sends the first control command to the tag 1 through one of the readers 2 (e.g., the first reader 21). In response to receiving the first control command, the tag 1 activates the inertial sensor. The inertial sensor measures the position information of the tag 1 in real time and sends the real time position information to the server 3 through the first reader 21. The server 3 determines the coordinates of the tag 1 in the second direction Y in the sensing auxiliary region 421 according to the real time position information, and then determines a motion trajectory of the tag 1 between the point M2 and the point M3 in the sensing auxiliary region 421, according to the coordinates of the tag 1 in the first direction X and the second direction Y.

If the server 3 determines that the tag 1 moves to the point M3 in the sensing auxiliary region 421, and determines that the tag 1 moves from the sensing auxiliary region 421 to the non-sensing auxiliary region 422 according to the coordinate of the tag 1 in the first direction X, the server 3 sends the second control command to the tag 1 through the first reader 21. In response to receiving the second control command, the tag 1 controls the inertial sensor to be in the sleeping state.

After the tag 1 moves from the point M3 to the point M4, the server 3 determines that the tag 1 is located in the sensing auxiliary region 421, and sends the first control command to the tag 1 again through the first reader 21. In response to receiving the first control command, the tag 1 activates the inertial sensor. The inertial sensor measures the position information of the tag 1 in real time and sends the real time position information to the server 3 through the first reader 21. The server 3 determines the coordinates of the tag 1 in the second direction Y in the sensing auxiliary region 421 according to the real time position information, and the server 3 determines the motion trajectory of the tag 1 in the sensing auxiliary region 421 according to the coordinates of the tag 1 in the first direction X and the second direction Y.

In the case where the server 3 does not receive the arrival time information within the preset period of time, the server 3 determines that the tag 1 has entered the first region 43 corresponding to the room D according to the motion trajectory of the tag 1 from the point M4 to the point M5 in the sensing auxiliary region 421. The server 3 sends the third control command to the tag 1 through the first reader 21. The tag 1 receives the third control command, and in response to the received third control command, the tag 1 controls the frequency at which the ultra-wideband signals are transmitted to be reduced from the first frequency to the second frequency.

The server 3 determines the point M5 as a starting point at which the ultra-wideband signal is lost, according to a time when the readers 2 lose the ultra-wideband signal and the motion trajectory of the tag 1 from the point M4 to the point M5 point in the sensing auxiliary region 421.

Taking an example in which the positioning region 4 is a region including the stairway and a plurality of entrances, and the stairway is connected to different floors, the sensing auxiliary regions are regions where the stairway is located. As for an arrangement of the auxiliary sensor regions, reference may be made to above description.

The stairs block a propagation of the ultra-wideband signal, a reader 2 at an entrance of the stairway in a floor cannot receive the ultra-wideband signal transmitted by the tag 1 located in the stairway or in a certain region connected to the stairway. Therefore, according to a motion trajectory of the tag 1 in a sensing auxiliary region 421, in the case where the server 3 does not receive the information sent by each reader 2 within the preset period of time, the server 3 determines that the tag 1 is in a certain region.

Taking an example in which the tag 1 continues to move along path M5-M6 in FIG. 5, after the tag 1 enters the first region 43 corresponding to the room D, when the tag 1 moves to the point M6, the readers 2 receive the ultra-wideband signal transmitted by the tag 1 again, which indicates that the tag 1 has moved from the room D to the second region 42. The server 3 then sends the fourth control command to the tag 1 through the first reader 21. In response to receiving the fourth control command, the tag 1 controls the frequency at which the tag 1 transmits the ultra-wideband signals to be increased from the second frequency to the first frequency.

The server 3 determines the point M6 as a positioning base point according to a time when each reader 2 receives the ultra-wideband signal again. Herein, if the tag 1 is in the sleeping state in the first region 43, the tag 1 needs to be activated at the point M6.

If the tag 1 continues to move along path M6-M7 in FIG. 5, the tag 1 is positioned according to the above method for positioning the tag 1 whose motion trajectory is from the point M4 to the point M5, and details will not be repeated herein.

Figure 4:
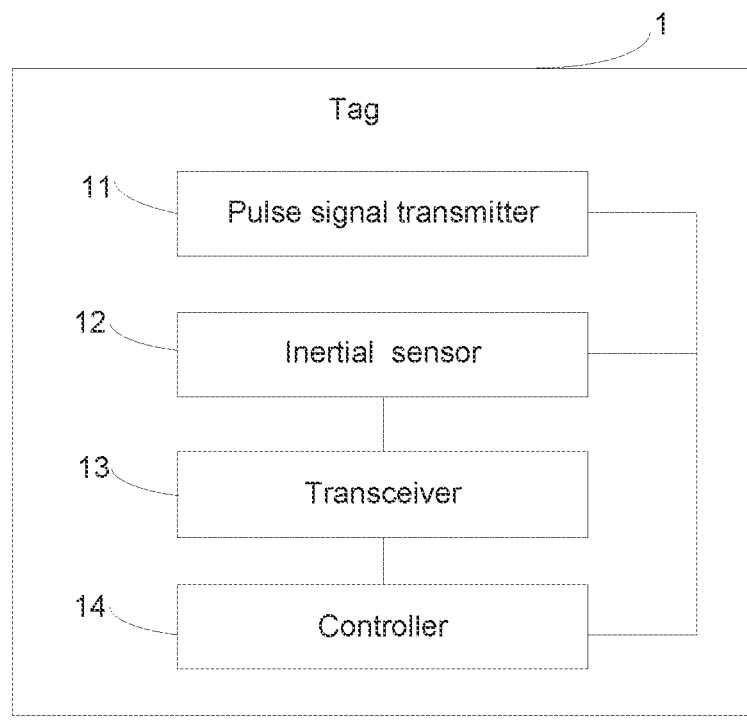
FIG. 4 is a block diagram of a tag, in accordance with some embodiments.

In addition, as shown in FIG. 4, some embodiments of the present disclosure provides a tag 1. The tag 1 is configured to perform some steps of the positioning method provided in the embodiments as above.

The tag 1 includes a pulse signal transmitter 11, a transceiver 13, a controller 14, and an inertial sensor 12. The pulse signal transmitter 11 is configured to transmit the ultra-wideband signals. The transceiver 13 is configured to receive the first control command from the reader 2. The controller 14 is configured to activate the inertial sensor in response to the first control command. The inertial sensor 12 is configured to collect position information of the tag 1 in an activated state. The transceiver 13 is further configured to send the position information of the tag 1 to the reader 2.

In some examples, the transceiver 13 includes a Bluetooth module or a Wi-Fi module. The pulse signal transmitter 11 may include a UWB antenna.

It will be noted that, a power spectral density of signals transmitted by the transceiver 13 is greater than a power spectral density of the ultra-wideband signals. Accordingly, a penetrating power of information sent by the transceiver 13 is stronger, and a transmission distance of the information sent by the transceiver 13 is farther than that of the ultra-wideband signals.

In some examples, the controller 14 may be further configured to generate ultra-wideband signals.

In some examples, the controller 14 may be a central processing unit (CPU), other general-purpose processors, a digital signal processor (DSP), an application specific integrated circuits (ASIC), a field programmable gate array (FPGA), or other programmable logic devices, a discrete gate or transistor logic devices, a discrete hardware component, etc.

Figure 10:
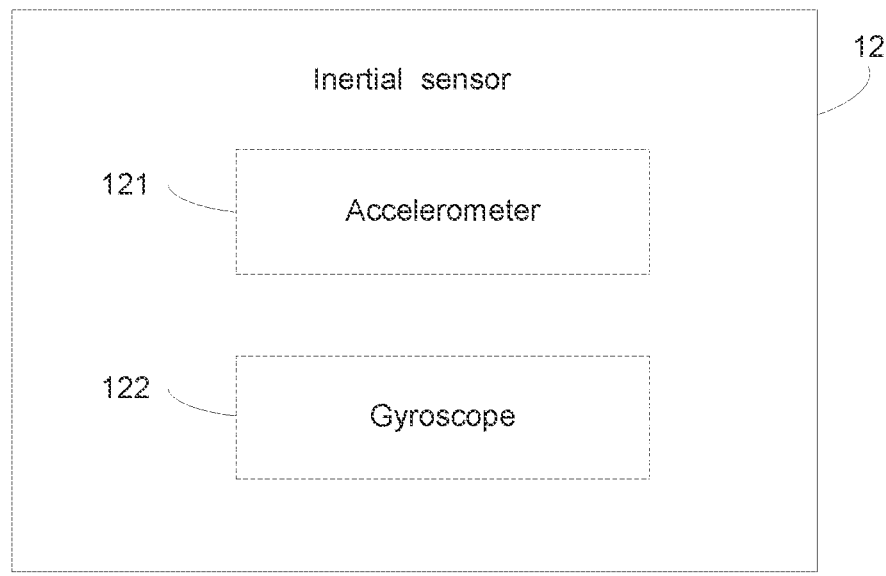
FIG. 10 is a block diagram of an inertial sensor, in accordance with some embodiments.

In some embodiments, as shown in FIG. 10, the inertial sensor 12 may include an accelerometer 121 and a gyroscope 122. The accelerometer 121 is configured to measure an acceleration of the tag 1, and the gyroscope 122 is configured to measure an angular velocity of the tag 1, so that the inertial sensor 12 is configured to measure the position information of the tag 1.

Figure 11:
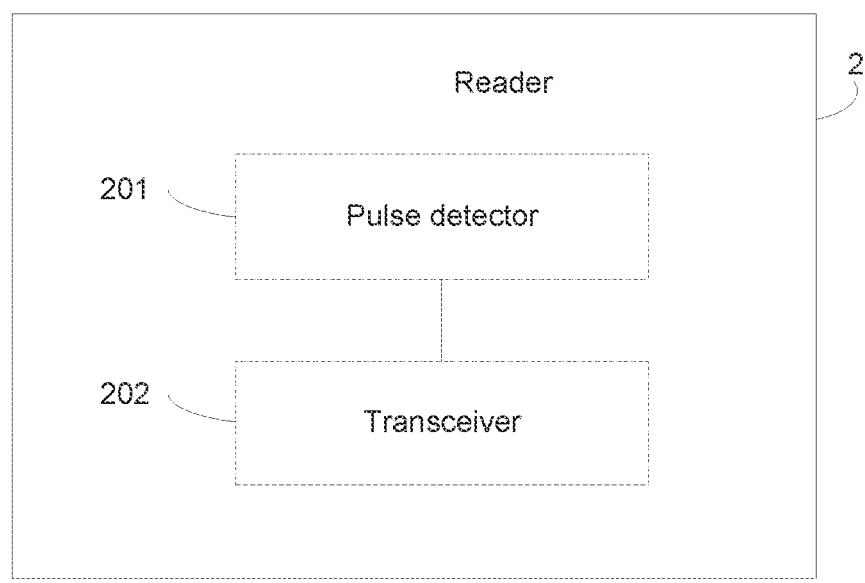
FIG. 11 is a block diagram of a reader, in accordance with some embodiments.

In some embodiments, a reader 2 is provided. As shown in FIG. 11, the reader 2 may include a pulse detector 201 and a transceiver 202. The pulse detector 201 is configured to detect a time when the ultra-wideband signal reaches the reader 2, i.e., the arrival time. The transceiver 202 is configured to perform information transmission with the first transceiver 13 and the server 3. That is, the reader 2 performs the information transmission with the server 3 and the first transceiver 13 through the transceiver 202 of the reader 2.

In some examples, the transceiver 202 includes a Bluetooth module or a Wi-Fi module. The pulse detector 201 may include a UWE antenna.

Some embodiments of the present disclosure provide a non-transitory computer-readable storage medium storing computer programs that, when executed by a processor, cause the processor to perform one or more steps of the positioning method in any one of the above embodiments.

For example, the non-transitory computer-readable storage media includes but is not limited to: a magnetic storage device (e.g., a hard disk, a floppy disk, or a magnetic tape, etc.), an optical disk (e.g., a compact disk (CD), a digital versatile disk (DVD), etc.), a smart card and a flash memory device (e.g., an erasable programmable read-only memory (EPROM), a card, a stick or a key drive, etc.).

The forgoing descriptions are merely specific implementations of the present disclosure, but the protection scope of the present disclosure is not limited thereto. Any changes or replacements that a person skilled in the art could conceive of within the technical scope of the present disclosure shall be included in the protection scope of the present disclosure. Therefore, the protection scope of the present disclosure shall be subject to the protection scope of the claims.

What is claimed is:

1. A positioning method, performed at a server, the method comprising:
    receiving, at a frequency, arrival time information from a plurality of readers, wherein the arrival time information includes information indicating time at which the readers receive a same ultra-wideband signal transmitted by a tag;
    determining, according to the arrival time information, that the tag is in a sensing auxiliary region of a positioning region, wherein the positioning region includes a second region extending along a first direction and a plurality of first regions that are arranged on at least one side of the second region, at least some of the first regions located on each side of the second region are arranged along the first direction, the second region includes a plurality of sensing auxiliary regions, and each sensing auxiliary region is connected to at least one of the first regions;
    sending a first control command to one of the readers, so that the tag activates an inertial sensor thereof according to the first control command;
    receiving, from the reader, position information of the tag in the sensing auxiliary region obtained by the inertial sensor;
    determining, according to the position information of the tag in the sensing auxiliary region, a first motion trajectory of the tag in the sensing auxiliary region; and
    determining, according to the first motion trajectory, whether the tag enters one of the first regions, wherein the second region further includes a plurality of non-sensing auxiliary regions; and
    if it is determined that the tag does not enter any one of the first regions, the method further comprises:
        determining, according to the first motion trajectory, whether the tag is in one of the non-sensing auxiliary regions; and
        sending a second control command to the reader in response to determining that the tag is in one of the non-sensing auxiliary regions, so that the tag controls the inertial sensor to be in a sleeping state according to the second control command.

2. The positioning method according to claim 1, wherein determining, according to the arrival time information, that the tag is in a sensing auxiliary region, includes:
    determining, according to the arrival time information, a coordinate of the tag in the first direction; and
    in response to determining that the coordinate of the tag in the first direction is within a coordinate range of the sensing auxiliary region in the first direction, determining that the tag is in the sensing auxiliary region.

3. The positioning method according to claim 1, wherein sending the second control command to the reader in response to determining that the tag is in one of the non-sensing auxiliary regions, so that the tag controls the inertial sensor to be in a sleeping state according to the second control command, includes:
    sending the second control command to the reader in response to determining that the tag is in one of the non-sensing auxiliary regions, so that according to the second control command, the tag controls the inertial sensor to be in the sleeping state and clears position information cached in the inertial sensor.

4. The positioning method according to claim 1, wherein determining, according to the first motion trajectory, whether the tag enters one of the first regions, includes:
    determining, according to the first motion trajectory, whether the tag gradually approaches one of the first regions;
    determining whether the server does not receive arrival time information from the readers within a preset period of time;
    in response to determining that the tag gradually approaches one of the first regions and that the server does not receive arrival time information from the readers within the preset period of time, determining that the tag enters the one of the first regions; and
    if else, determining that the tag does not enter the first regions.

5. The positioning method according to claim 1, wherein after the tag enters the one of the first regions, the method further comprises:
    sending a third control command to the reader, so that according to the third control command, the tag transmits the ultra-wideband signals at a second frequency less than the first frequency.

6. The positioning method according to claim 1, wherein after the tag enters the one of the first regions, the method further comprises:
    determining, according to position information of the tag in the first region, a second motion trajectory of the tag in the first region.

7. The positioning method according to claim 1, wherein after the tag enters the first region, the method further comprises:
    determining, whether the server receives arrival time information from the readers again; and
    in response to determining that the server receives arrival time information from the readers again, sending a fourth control command to the reader, so that according to the fourth control command, the tag transmits the ultra-wideband signals at the first frequency.

8. The positioning method according to claim 7, wherein in response to determining that the server receives the arrival time information from the readers again, sending the fourth control command to the reader, so that according to the fourth control command, the tag transmits the ultra-wideband signals at the first frequency, includes:
    in response to determining that the server receives the arrival time information from the readers again, sending the fourth control command to the reader, so that according to the fourth control command, the tag transmits the ultra-wideband signals at the first frequency, and clears position information cached in the inertial sensor.

9. A positioning system, comprising:
    a tag, wherein the tag includes a pulse signal transmitter configured to transmit ultra-wideband signals, a transceiver configured to receive a first control command from a reader and send position information of the tag to the reader, a controller configured to activate an inertial sensor in response to the first control command, and the inertial sensor configured to obtain the position information of the tag in real time;

a plurality of readers arranged along a first direction in a second region of a positioning region, wherein the positioning region includes the second region extending along the first direction and a plurality of first regions that are located on at least one side of the second region, at least some of the first regions located on each side of the second region are arranged along the first direction, the second region includes a plurality of sensing auxiliary regions and a plurality of non-sensing auxiliary regions, and each sensing auxiliary region is connected to at least one of the first regions; the plurality of readers are configured to receive the ultra-wideband signals from the tag, and to send arrival time information to a server, the arrival time information include information indicating time at which the readers receive a same ultra-wideband signal transmitted by the tag; and the server configured to:
receive, at a frequency, the arrival time information from the readers;
determine, according to the arrival time information, that the tag is in a sensing auxiliary region of the plurality of the sensing auxiliary regions;
send the first control command to one of the readers;
receive the position information of the tag in the sensing auxiliary region obtained by the inertial sensor from the reader;
determine, according to the position information of the tag in the sensing auxiliary region, a first motion trajectory of the tag in the sensing auxiliary region; and
determine, according to the first motion trajectory, whether the tag enters one of the first regions, wherein the reader is further configured to:
receive the first control command from the server;
send the first control command to the tag;
receive the position information of the tag from the tag;
send the position information of the tag to the server, and
in a case where it is determined that the tag does not enter any one of the first regions, determine whether the tag is in one of the non-sensing auxiliary regions according to the first motion trajectory, and send a second control command to the reader in response to determining that the tag is in one of the non-sensing auxiliary regions, so that the tag controls the inertial sensor to be in a sleeping state according to the second control command.

10. The positioning system according to claim 9, further comprising:
a synchronization controller configured to synchronize clocks of the readers and to realize information exchange between the reads and the server.

11. The positioning system according to claim 9, further comprising a terminal device, wherein the server is further configured to send trajectory information of the tag to the terminal device, the trajectory information of the tag includes first motion trajectories of the tag in the sensing auxiliary regions and second motion trajectories of the tag in the first regions; and
the terminal device is configured to receive and display the trajectory information of the tag.

12. A positioning method, performed at a server, the method comprising:
receiving, at a frequency, arrival time information from a plurality of readers, wherein the arrival time information includes information indicating time at which the readers receive a same ultra-wideband signal transmitted by a tag;
determining, according to the arrival time information, that the tag is in a sensing auxiliary region of a positioning region, wherein the positioning region includes a second region extending along a first direction and a plurality of first regions that are arranged on at least one side of the second region, at least some of the first regions located on each side of the second region are arranged along the first direction, the second region includes a plurality of sensing auxiliary regions, and each sensing auxiliary region is connected to at least one of the first regions;
sending a first control command to one of the readers, so that the tag activates an inertial sensor thereof according to the first control command;
receiving, from the reader, position information of the tag in the sensing auxiliary region obtained by the inertial sensor;
determining, according to the position information of the tag in the sensing auxiliary region, a first motion trajectory of the tag in the sensing auxiliary region; and
determining, according to the first motion trajectory, whether the tag enters one of the first regions, wherein determining, according to the first motion trajectory, whether the tag enters one of the first regions, includes:
determining, according to the first motion trajectory, whether the tag gradually approaches one of the first regions;
determining whether the server does not receive arrival time information from the readers within a preset period of time;
in response to determining that the tag gradually approaches one of the first regions and that the server does not receive arrival time information from the readers within the preset period of time, determining that the tag enters the one of the first regions; and
if else, determining that the tag does not enter the first regions.

* * * * *